ced Sept. 8, 1959

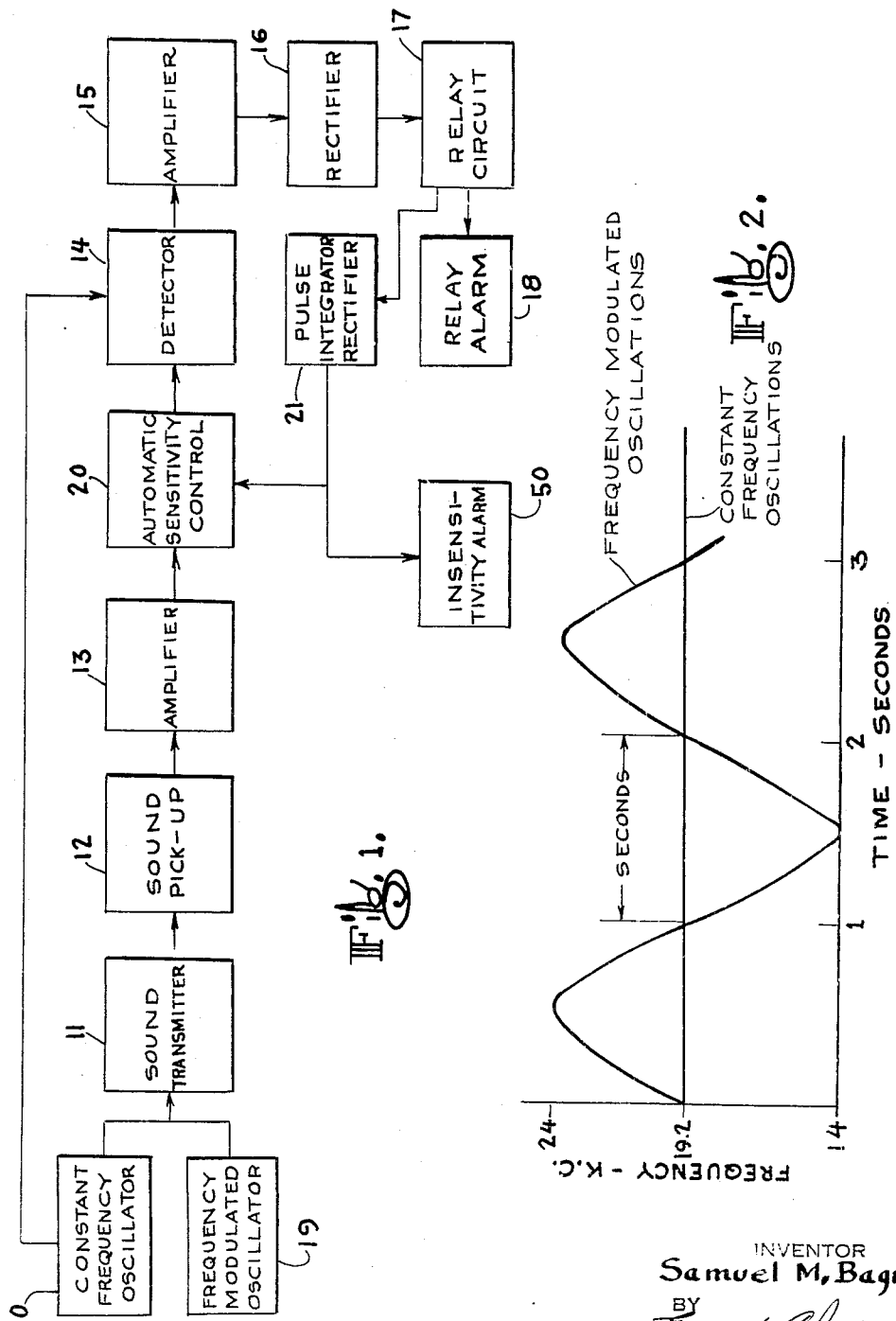

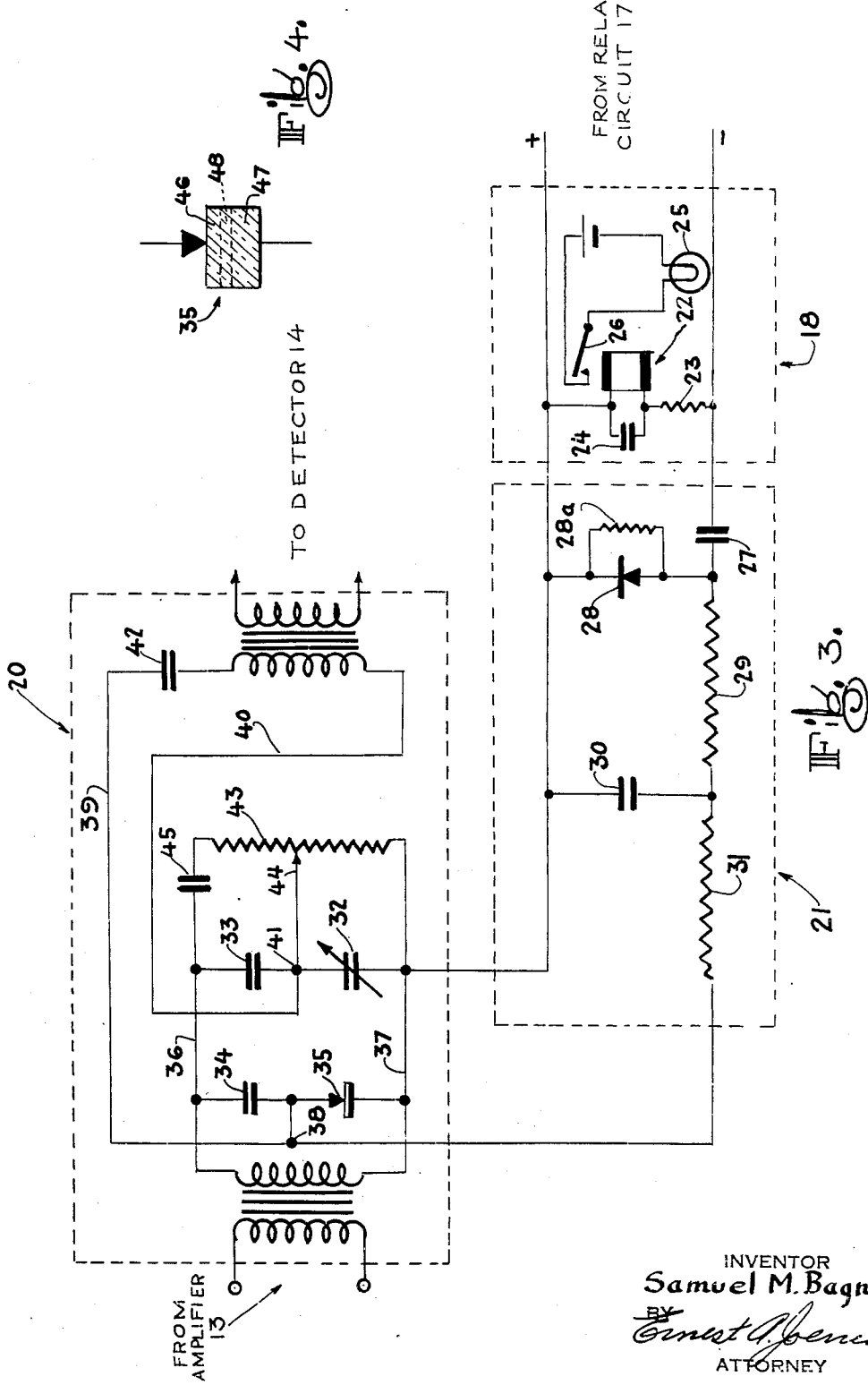

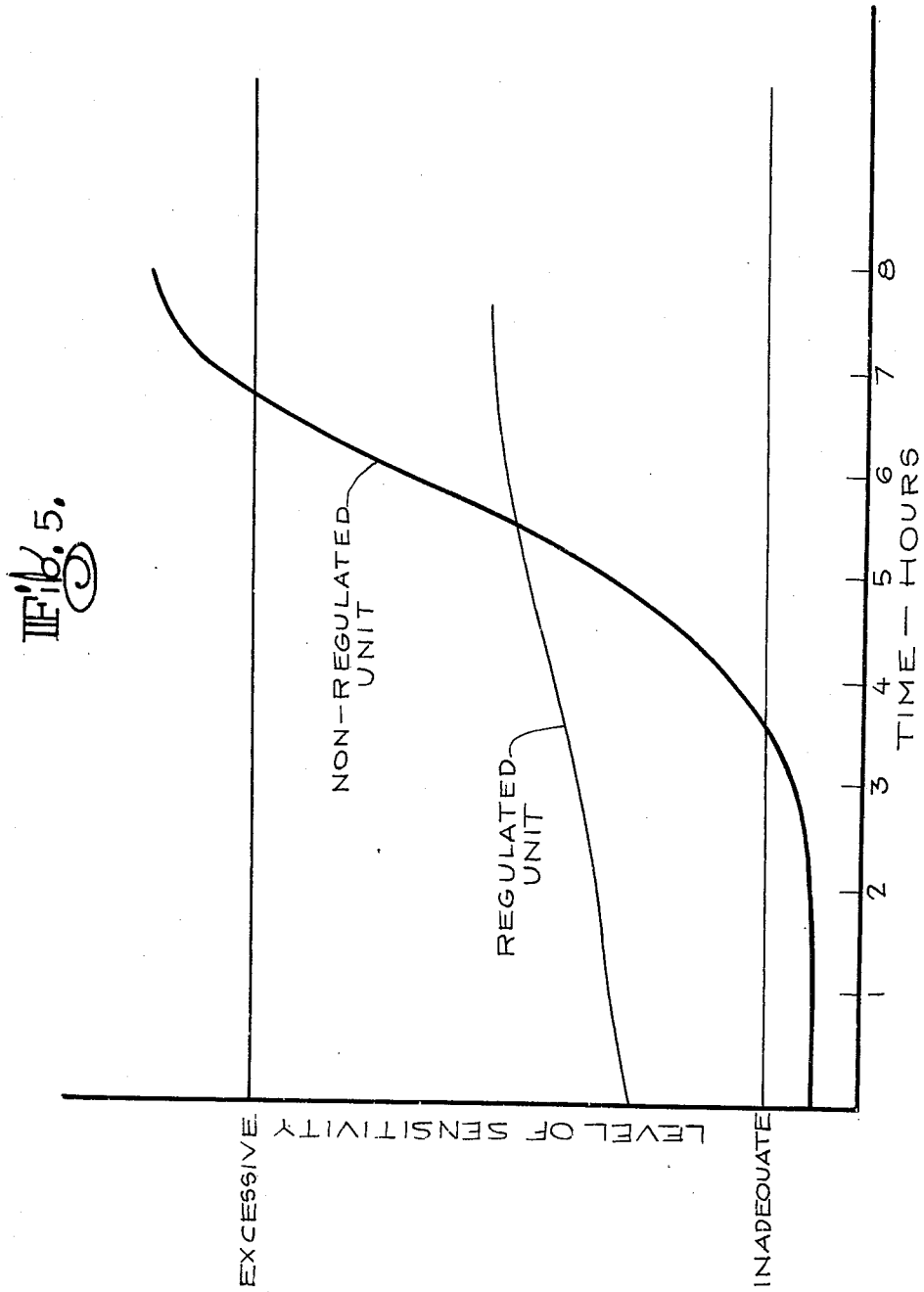

2,903,683

SENSITIVITY CONTROL OF APPARATUS FOR DE-
TECTING DISTURBANCES IN AN ENCLOSURE

Samuel M. Bagno, Belleville, N.J., assignor to Walter
Kidde & Company, Inc., Belleville, N.J., a corporation
of New York Application February 25, 1957, Serial No. 641,901

19 Claims. (Cl. 340—258)

The present invention relates to apparatus for detecting disturbances in an enclosure by giving an alarm in response to the detection of changes in frequency of generated and received radiations due to disturbances in the enclosure, such apparatus being disclosed in my prior United States Patent No. 2,655,645, and, more particularly, to the automatic control of the sensitivity of such apparatus.

One of the problems encountered in connection with the operation of such apparatus is that the sensitivity is affected by changes in the acoustical properties of an enclosure. These changes are primarily due to changes in the acoustic absorption of the enclosure and changes in the acoustic absorption of the air within the enclosure.

The amount of acoustic energy absorbed by the enclosure depends upon its geometrical configuration, that is, its ability to reflect energy waves rather than to absorb the same. Air pockets caused by open closets or drawers or niches tend to absorb energy rather than to reflect the same. Thus, should such pockets be closed off in different combinations, the energy absorbed by the enclosure varies appreciably. Also, variable loading of the enclosure changes the acoustic absorption thereof.

The acoustic absorption of the air varies appreciably throughout each day and depends upon a number of factors which can produce a multitude of combinations affecting the acoustic absorption of air. Among these factors are changes in relative humidity, temperature, chemical composition of the air and the amount of particles in the air.

It is conceivable that, under certain extreme conditions such as might be caused by the worst combination of changes in the loading and acoustic conditions of premises, a very great change in sensitivity might occur. Thus, should the sensitivity of the apparatus be adjusted under such a given set of conditions to detect a disturbance caused by a human being moving about in a room, a change in acoustic absorption to one extreme would make the apparatus oversensitive and detect a mouse, while a change to the other extreme would make the apparatus undersensitive and incapable of detecting even an elephant. In one case, the apparatus might give a false alarm, and, in the other case, an intruder might escape detection.

Heretofore, no successful solution to the foregoing problem has been offered, in spite of the fact that many of the technical considerations involved have been well known and have been disclosed in the literature.

Heretofore, when it was desired to control the sensitivity of a reception device, such as a radio receiver, for varying conditions of the transmitting media, a system of automatic sensitivity control was used. Such an automatic sensitivity control, known in the trade as an "AVC" system, generally consisted of a controllable radio frequency amplifier that amplified the received signal before detection. The detected signal was then fed back to control the amplifying power of the amplifier. Thus any slow variation in the received carrier amplitude tended to be compensated by introducing a countering variation in the amount of amplification. The received carrier at the detector thus tended to remain constant.

Such a system although applicable to a radio receiver is inoperative for maintaining the sensitivity of an ultrasonic alarm system. This is because the amount of carrier signal received at any instant has very little relation to the varying sensitivity of the system to an intruder traversing the area. The reason for this lies in the fact that an ultrasonic wave in an enclosure is almost completely reflected by its boundaries, walls, floors, etc. This results in a multiplicity of reflections before the wave is finally dissipated. At some first point in the space the phase at which all these various reflections arrive, may cause them to be additive, so that the resulting amplitude of the wave at that point would be the sum of all the amplitudes of the individual signals. If a microphone were placed at this point, it would see a very large signal. At a nearby second point in the space the various reflections may arrive out of phase with each other and thereby cancel. In that case, a microphone placed at the second point would detect zero signal. Since the time of transit of the wave (the velocity of sound) depends on the temperature, at some other temperature, cancellation may in contrast occur at the first point and amplitude addition at the second even though the position of the source is unchanged. In that way the signal received by a fixed microphone may vary in amplitude so that at some time it will receive any amplitude from zero to a given maximum, and only the maximum being a direct function of the energy radiated into the space. An intruder unlike a fixed microphone is moving throughout a large portion of the protected area. He tends to cover a sufficient number of points so that the ultrasonic energy striking him and reflected off his body tends to some average that depends on the total ultrasonic energy radiated into the enclosure. The sensitivity of the receiver in sensing the intruder depends on the total energy in the area and how all these various points in the space would reflect energy back to the receiver as the intruder traverses them in sequence. Thus the ultrasonic energy received by the receiver when no intruder is present bears no relation to its sensitivity to an intruder unless the phase at the receiving point at that moment is known. The ultrasonic energy depends on the phase of the multiple reflections at the moment. For the same reason, the received energy cannot be used to control the sensitivity as it is in an AVC system.

In my prior United States Patent 2,732,544, it is disclosed that the way to overcome this difficulty is to send out transient impulses that do not last sufficiently long that its reflections can interfere with each other. The received signal behaves somewhat like a radar image which is also caused by multiple sequential reflections of a series of pulses whose overall density depends on the sensitivity of the system. In accordance with the general principles outlined in Patent 2,732,544, the present invention uses transient pulses for measuring and controlling the sensitivity. However, a somewhat different method is employed to generate the transient pulses. These pulses are generated in the detecting and amplifying system by a swept frequency signal as will be explained hereinafter. Accordingly, an object of the present invention is to overcome the difficulties heretofore experienced in a simple, practical and economical manner.

Another object is to provide automatic sensitivity control for disturbance detecting apparatus of the type indicated herein.

A further object is to provide such apparatus which varies in sensitivity proportionately to the acoustical properties of the enclosure, and possible variations in the amplifying system.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by generating energy radiations at a substantially constant high frequency for detecting disturbances in the enclosure, generating energy radiations at another frequency, interacting both radiations to produce a low frequency signal, and utilizing the amplitude of the low frequency signal to vary the sensitivity of the apparatus in relation to changes in the acoustical properties of the enclosure, for example, by controlling the sensitivity of the disturbance detecting means or the alarm means.

A preferred embodiment of the invention has been chosen for purposes of illustration and description, and is shown in the accompanying drawings, forming a part of the specification, wherein:

Fig. 1 is a block diagram of an apparatus for detecting disturbances in an enclosure which embodies the sensitvity control in accordance with the invention.

Fig. 2 is a graph, wherein frequency is plotted against time, which illustrates a preferred manner of creating a signal adapted to be translated into pulses for controlling the sensitivity of the apparatus.

Fig. 3 is a circuit diagram of a network illustrating the details of certain portions of the block diagram.

Fig. 4 is a schematic sectional view illustrating a preferred form of rectifying element adapted to be employed in the network shown in Fig. 3.

Fig. 5 is a graph illustrating the sensitivity of the apparatus related to the acoustical properties of an enclosure over an eight hour period, with and without controlled sensitivity.

Referring to the drawings in detail, a block diagram is shown in Fig. 1 which illustrates the essential components of the apparatus in accordance with the present invention including the components, or their equivalents, of the apparatus disclosed in the patent referred to herein and to which the present invention is applied. Thus, for a better understanding of the present invention in relation to its field of application, the block diagram will be described first with reference only to the prior apparatus.

Generally described, one form of such prior apparatus comprises a constant frequency oscillator 10, a sound transmitter 11, connected to the output of the oscillator 10 adapted to radiate a standing wave energy pattern within an enclosure, a sound pick-up 12 for receiving sound energy radiation and transducing the same to electrical radiations, a high frequency amplifier 13 having its input connected to the output of the sound pick-up, a detector 14 having an input operatively connected to the output of the amplifier 13 and having an input operatively connected to the constant frequency oscillator 10 for giving a fluctuating current output upon the detection of frequency changes between the transmitted and received radiations and oscillations, a low frequency amplifier 15 having its input connected to the detector output, a rectifier 16 having its input connected to the output of the amplifier 15, a relay circuit 17 having its input connected to the output of the rectifier, and a relay and alarm network 18 having its input connected to the output of the relay circuit.

As described in greater detail in the patent referred to herein, motion of an intruder or another disturbance within the enclosure sought to be detected produces a "Doppler" frequency in the wave pattern, whereby the received frequency becomes either greater or less or with multiple reflections both greater and less simultaneously than the transmitted frequency. This change in frequency is of a relatively low order and is detected by the detector 14, whereupon the detector generates a signal which is amplified and rectified and is caused to operate the alarm 18.

Since the amplitude of the received signal going into the detector can vary because of acoustical changes in the enclosure or sensitivity changes in the apparatus itself, the amplitude of the disturbance in the enclosure may be of various magnitudes depending on the size of the moving object, there is no assurance that the detector will be sensitive at all times to a disturbance of a minimum amplitude which is to be detected and that the detector will be insensitive at all times to a disturbance of a maximum amplitude which is not to be detected.

In furtherance of the present invention, the sensitivity of the apparatus so far described, in general, is controlled by a frequency modulated oscillator 19 having its output connected to the transmitter 11, whereby the detector 14 receives this signal together with the signal generated by the oscillator 10 and the interaction of these signals causes the detector to generate in the final output a low frequency pulse in the manner about to be more fully described. This pulse is amplified and rectified and conducted through the relay circuit 17 to an automatic sensitivity control 20 (preferably through a pulse integrator and rectifier 21), which controls the amplitude of the signal the detector receives from the amplifier 13 on an inverse order of magnitude in relation to the amplitude of the pulses.

In Fig. 2, a graph is shown which illustrates one way of interacting frequencies to produce pulses. For example, the oscillator 10 may generate radiations having a substantially constant frequency at about 19.2 kilo-cycles per second, and the oscillator 19 may generate radiations having a modulated frequency within a band ranging from about 14 to about 24 kilo-cycles per second. Thus when these radiations pass through the detector 14, a pulse is generated each instant the modulated frequency approaches the constant frequency. By the selection of the foregoing frequency values, such pulses are generated at about one second intervals.

The amplitude of these pulses for any fixed acoustic condition within the enclosure varies with the phase relationship of the voltage of the constant frequency radiations and the modulated frequency radiations at the instant their frequencies coincide. This can be shown by the following derivation.

The resulting signal $f(t)$ due to the detection of the 19 KC signal whose angular frequency $w_1$ beating with the variable angular frequency signal $(w_2+Bt)$ (where B determines the rates of frequency change) has as a component:

$$f(t) = A \cos w_1 t \cos [(w_2+Bt)t+\theta]$$

This result can be obtained by a binomal expansion where the sweep occurs at some arbitrary phase angle $\theta$ in respect to the 19 KC wave. By a trigonometric identity $$f(t) = \frac{A}{2} \cos [(w_1+w_2+Bt)t+\theta]$$
$$+ \frac{A}{2} \cos [(w_1-w_2-Bt)t-\theta]$$

When $w_1=w_2$, the second half of $f(t)$ becomes $$\frac{A_1}{2} \cos (Bt^2+\theta)$$

Since the detector feeds into the low frequency (<60 cycle) amplifier, the term $$\frac{1}{2} \cos [(w_1+w_2+Bt)t+\theta]$$

can be neglected, since $w_1 > 120{,}000$ and the term $$\frac{A_1}{2} \cos [(w_1-w_2-Bt)-\theta]$$

is the only one whose components can be expected to get through the audio amplifier. Since the repetition rate of the sweep (1 c.p.s.) is low in comparison to the low frequency response (35 c.p.s.) of the amplifier, we can represent the spectral density $(A_w)$ of $\frac{A_1}{2} \cos[(w_1-w_2-Bt)-\theta] = \frac{A_1}{2}\cos(Bt^2+\theta)$ by a Fourier integral as:

$$A_w = \frac{A}{2}\int_{-\infty}^{+\infty} \cos[Bt^2+\theta]\cos wt\, dt = A\int_0^\infty \cos[Bt^2+\theta]\cos wt\, dt$$

since $t^2$ and $\cos wt$ assume the same value for $+$ or $-t$.

By a trigonometric identity $$A_w = A[\cos\theta \int_0^\infty \cos Bt^2 \cos wt\, dt - \sin\theta \int_0^\infty \sin Bt^2 \cos wt\, dt]$$

But:

$$\int_0^\infty \cos Bt^2 \cos wt\, dt = \frac{1}{4}\left(\frac{2\pi}{B}\right)^{1/2}\left[\cos\frac{w^2}{4B} + \sin\frac{w^2}{4B}\right]$$

And $$\int_0^\infty \sin Bt^2 \cos wt\, dt = \frac{1}{4}\left(\frac{2\pi}{B}\right)^{1/2}\left[\cos\frac{w^2}{4B} - \sin\frac{w^2}{4B}\right]$$

See table of Integral Transforms, Bateman Manuscript Project vol. 1, pages 23 and 24, McGraw-Hill, $$\therefore A_w = A\left[\cos\theta\cos\frac{w^2}{4B} + \cos\theta\sin\frac{w^2}{4B} - \sin\theta\cos\frac{w^2}{4B} + \sin\theta\sin\frac{w^2}{4B}\right]\left[\frac{1}{4}\left(\frac{2\pi}{B}\right)^{1/2}\right]$$

and by further trigonometric identities $$A_w = A\left[\frac{1}{4}\left(\frac{2\pi}{B}\right)^{1/2}\right]\left[\cos\left(\frac{w^2}{4B}-\theta\right) + \sin\left(\frac{w^2}{4B}-\theta\right)\right]$$

$$= A\sqrt{2}\left[\frac{1}{4}\left(\frac{2\pi}{B}\right)^{1/2}\right]\cos\left(\frac{w^2}{4B}-\theta+\frac{\pi}{4}\right)$$

When $$\theta = \left(\frac{w^2}{4B} + \frac{\pi}{4}\right)$$

$\cos\left(\frac{w^2}{4B}-\theta+\frac{\pi}{4}\right)$ is a maximum

The cosine at that maximum is 1. Under those conditions the two signals can be considered to coincide in phase. $A_w$ is likewise a maximum at that phase angle $\theta$ and is independent of the value of $w$. Therefore the component of the detected signal that gets through the low frequency amplifier depends on the phase relation of the constant frequency radiations and the modulated frequency radiation when $t=0$ and $w_1=w_2$ (when their frequencies coincide).

The low frequency amplifier transfer function $F(w)$ allows a spectral density $A_w F(w)$ to get through. If we consider the detected signal as a function of time it is obvious that the angular frequency of that signal $1/2A\cos(Bt^2+\theta)$ is in the low frequency range only as $t$ approaches 0. Then a pulse passes through the amplifier having the average amplitudes specified by $A_w$ and dependent on the instantaneous value of $\theta$.

When these radiations are exactly in phase at the time these frequencies are equal, the pulse will be of a maximum value, and, when they are exactly 90° out of phase, the value of the pulse will be nearly zero. Over a period of several minutes, the pulse amplitude is caried through out the entire gamut of the phase relationship, whereby the average amplitude of the pulses over such a period will provide a good indication of the acoustic condition existing during such period. Thus, as the acoustic properties of the enclosure change, such change is reflected by the change in average pulse amplitude.

As shown in Fig. 3, the amplified and rectified pulses pass through the relay circuit together with such steady state unidirectional current which results from the detection of frequency changes between transmitted and received radiations and are conducted to the relay and alarm network. This network is rendered operative by the steady state current, but is rendered insensitive to the pulses by utilizing a slow acting relay arrangement.

For example, the relay and alarm network may comprise a relay 22, a resistor 23 connected in series with the relay across the relay circuit output, a capacitor 24 shunted across the relay 22, to provide a time delay arrangement, and an indicating device 25 such as a light or bell or the like under the control of switch contacts 26 of the relay 22.

As previously indicated, the pulses also are conducted from the output of the relay circuit to the rectifier integrator network 21 which serves to average the amplitude of the pulses over a period of between three and ten minutes, for example. This network (Fig. 3) comprises a capacitor 27 in the negative side of the input, a rectifying element 28 connected across the sides to conduct from negative to positive and having a resistor 28a connected in parallel therewith, a resistor 29 in the negative side, a capacitor 30 connected across the sides, and an isolating resistor 31 in the negative side. The components of this network have electrical values to establish the desired time constant, whereby the capacitor 30 stores the pulses of different amplitude over the desired period and discharged pulses having an averaged amplitude which are conducted to the input of the automatic sensitivity control 20.

With further reference to Fig. 3, the sensitivity control network 20 may comprise a normally balanced capacitance-type bridge including a side having a first capacitor 32 (which may be variable to effect balancing of the bridge) and a second capacitor 33 connected in series therein and including a second side having a third capacitor 34 and a PN silicon junction 35, connected in series therein, which serves as the fourth capacitor, a high frequency input connecting the output of the amplifier 13 to the junctions of the sides of the bridge at 36 and 37, a low frequency fluctuating input connected to the output of pulse integrator and rectifier 21 with the negative side to the junction between the capacitor 34 and the PN silicon junction 35 at 38 and the positive side at 37, and an output connected to the input of the detector 14 including a side 39 connected at 38 and a side 40 connected to the junction of the capacitors 32 and 33 at 41. A capacitor 42 is connected in the side 39 in order not to short circuit points 38 and 41 for a direct current bias, to thereby isolate 38 and 41 direct current-wise.

Power factor correction is attained by connecting a resistor 43 across 36 and 37 which has a tap 44 connected to 41, and connecting a capacitor 45 in 36.

An important feature of the bridge is that the bridge is a very good insulator for direct current, thereby serving as a negligible shunt across the capacitor 30 and hardly affecting the time constant of the circuit. When the direct current voltage in the non-conducting direction is changed, a condition analogous to an insulating layer develops betwen the P and the N junctions forming a capacitor. The thickness of the insulating layer varies almost directly with the sum of the applied voltage and the contact potential of the PN junction. As the thickness of the layer changes, its capacity is decreased. The change of capacity is inversely as the thickness of the layer. Thus, for a typical silicon PN junction designed to rectify 300 milliamperes, the capacity of the junction varies from about 22 M.M.F. with zero direct current inverse bias to 8 M.M.F. at 4.5 volts direct current inverse bias. Under those conditions and at room temperature, the leakage resistance of such a typical PN junction unit has been measured at 8000 megohms which shunting capacitor 30 produces a negligible change in the time constant of a circuit arranged to have a nominal time constant of five minutes.

If the bridge 20 is balanced with a 4.5 volts direct current inverse bias on the PN junction it will be completely unbalanced with zero direct current bias. Thus, at zero direct current bias, a fair sized voltage at 19 kilocycles per second will be fed to the detector 14. This voltage will decrease as the direct current bias on the junction is increased, until at the 4.5 volts balance nothing will be fed to the detector. This bias voltage, coming from the output pulses across the relay circuit, increases the sensitivity of the detector when the pulse signal is too small and decreases it when the signal is too large, thereby controlling the sensitivity of the system.

In operation, the bridge is adjusted to admit the received radiations, at a predetermined amplitude for a given set of acoustic conditions in the enclosure, to the detector at a desired ampltiude. The received pulses of averaged amplitude under these conditions do not disturb the admittance of the bridge, whereby the detector 14 has the desired sensitivity for the given set of conditions. Should such acoustic condition of the enclosure change for any one or more of the various reasons enumerated herein, the next averaged pulse, which is conducted to the low frequency fluctuating input of the bridge, corrects the balance of the bridge to render the same either more or less admittive as is required to maintain the amplitude of the detector input substantially constant, whereby the sensitivity of the system is maintained constant.

For example, should the amplitude of the received high frequency radiations conducted from the amplifier 13 to the detector 14 be of a lesser value, the detector would receive less energy. When this occurs, the pulses generated at one second intervals also are of a lesser value and the averaged pulse when conducted to the bridge also is of a lesser value, whereby less bias is applied of an order to make the bridge sufficiently admittive to reestablish the desired amplitude of the high frequency radiations received by the detector from the amplifier 13. Likewise, should the amplitude of the received radiations be of a greater value, the averaged pulse is greater and applies more bias of an order to make the bridge less admittive and reduce the amplitude received by the detector to its desired value.

In Fig. 5, the results of a test are illustrated wherein a transmitter 11 was placed in a cardboard box from which the cover had been removed, and a vane or shutter was positioned closely adjacent to the top of the box, to close the same. This vane was slowly rotated from closed to fully open position over a period of about eight hours, whereby the field strength of the transmitted wave energy was artificially controlled. Two receiving units were set up, one with sensitivity regulation and one without sensitivity regulation, and the average outputs thereof was observed.

During the time the box was fully closed to about 40% open, the sensitivity of the non-regulated unit was inadequate to enable the unit to function. As the box was further opened, the sensitivity increased sharply. During the time the box was about 80% open to fully open, the sensitivity of the non-regulated unit became excessive, whereby the output thereof was so high that it interfered with the functioning thereof.

During the time the box was fully closed to fully opening, the sensitivity of the regulated unit was adequate at all times and nowhere near excessive at any time, whereby this unit functioned under the extreme conditions to which it was subjected. The increase in field strength of the transmitted wave energy merely caused a gradual increase in sensitivity within permissible limits.

An insensitivity alarm 50 can be connected to the output of the pulse integrator 21 so as to give an alarm if for any reason the change in sensitivity becomes such that there is insufficient bias to reestablish control. This condition may occur for example, due to failure of a component, whereby the alarm system becomes defective. In that case, the insensitivity alarm would notify the alarm company that the system requires attention. Such an insensitive condition may also be caused if the sound transmitter or receiver is covered in an attempt to defeat the system. Such an attempt would then be obviated. The insensitivity alarm may consist of a voltage sensitive relay which would give an alarm if the voltage across the capacitor 30 dropped to too low a value.

A similar alarm can be generated if the bias potential reaches too high a value so as to render the system inoperative. A preferred way of accomplishing this result is to feed the constant frequency signal (which, as shown, is fed directly to the detector 14 from the oscillator 10) from the oscillator 10 through the automatic sensitivity control 20 to the detector 14 instead. If that supplied signal is made substantially greater than the signal obtained from the sound pickup, the steady state output of the detector will be indicative of the bias. That detector output could then work the insensitivity alarm relay directly. Such an arrangement would have the advantage that the insensitivity alarm would not shunt the integrator circuit and that sufficient output could be made available at the detector to work an alarm in a manner similar to that shown in United States Patent No. 2,655,645.

From the foregoing description, it will be seen that the present invention provides an arrangement for controlling the sensitivity of apparatus for detecting disturbances in an enclosure which arrangement is relatively simple, is accurate and reliable, and is economical to manufacture and assemble because a minimum of additional elements are required. Also, such sensitivity control can be installed in existing apparatus in a convenient manner by addition of the oscillator 19 and the networks 20 and 21, and by modification of the relay and alarm network 18.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a network for controlling the sensitivity of apparatus for detecting disturbances within an enclosure by detecting frequency changes between transmitted and received energy radiations, the combination of means for transmitting a source of energy radiations having a substantially constant frequency for detecting disturbances in the enclosure, means for intermittently transmitting another source of energy radiations, means for generating pulses by the interaction of radiations and oscillations, and means for causing the pulses to vary the sensitivity of the apparatus.

2. In a network for controlling the sensitivity of apparatus for detecting disturbances within an enclosure by detecting frequency changes between transmitted and received energy radiations, the combination of means for transmitting a source of energy radiations having a substantially constant frequency for detecting disturbances in the enclosure, means for intermittently transmitting another source of energy radiations, means for generating pulses by the interaction of radiations and oscillations, means for averaging the amplitude of a substantial number of received pulses, and means for causing the averaged pulses to vary the sensitivity of the apparatus.

3. In a network for controlling the sensivity of apparatus including an electronic detector for detecting disturbances within an enclosure by detecting frequency changes between transmitted and received energy radiations, the combination of means for transmitting a source of energy radiations having a substantially constant frequency for detecting disturbances in the enclosure, means for transmitting another source of energy radiations intermittently having the same frequency as said first radiations, means for generating pulses by the interaction of radiations and oscillations, and means for causing the pulses to control the sensitivity of the detector.

4. In a network for controlling the sensitivity of apparatus for detecting disturbances within an enclosure by detecting frequency changes between transmitted and received energy radiations, the combination of means for transmitting a source of energy radiations having a substantially constant frequency for detecting disturbances in the enclosure, means for transmitting another source of energy radiations having a modulated frequency and intermittently having the same frequency as said radiations, a detector for generating pulses by the interaction of radiations and oscillations, means for averaging a substantial number of received pulses, and means for causing averaged pulses to vary the sensitivity of the detector.

5. In apparatus for detecting frequency changes between transmitted and received radiations caused by disturbances within an enclosure, a network for adjusting the sensitivity of the apparatus comprising a detector for interacting energy radiations of different high frequency values selected to create a low frequency signal and responsive to frequency changes between transmitted and received radiations, and means for receiving the signal and translating the same into samples having an amplitude in relation to the acoustical properties within the enclosure and the amplifier characteristics of the rest of the system and being connected to the input of said detector to control the sensitivity thereof.

6. In apparatus for detecting frequency changes between transmitted and received radiations caused by disturbances within an enclosure, a network for adjusting the sensitivity of the apparatus comprising a detector for interacting energy radiations of different high frequency values selected to create a low frequency signal and responsive to frequency changes between transmitted and received radiations, means for periodically averaging the amplitude of the signal and translating the same into a bias having an amplitude in relation to the acoustical properties within the enclosure and being connected to the input of said detector to control the sensitivity thereof.

7. In apparatus for detecting frequency changes between transmitted and received radiations caused by disturbances within an enclosure, a network for adjusting the sensitivity of the apparatus comprising a detector for interacting energy radiations having a modulated frequency within a band of high frequencies and energy radiations and oscillations having a substantially constant frequency within said band of frequencies to create a low frequency signal and responsive to frequency changes between transmitted and received radiations, and means for receiving the signal and translating the same into a bias having an amplitude in relation to the acoustical properties within the enclosure and being connected to the input of said detector to control the sensitivity thereof.

8. In a network for controlling the sensitivity of apparatus for detecting disturbances within an enclosure by detecting frequency changes between transmitted and received energy radiations, the combination of means for generating energy radiations having a modulated frequency within a given band of frequencies, means for generating energy radiations having a substantially constant frequency within said band of frequencies, a detector for generating a pulse at each instant the modulated frequency and the substantially constant frequency are coincident in frequency, and means for causing the pulses to vary the input to said detector in relation to the amplitude of the pulses.

9. In a network for controlling the sensitivity of apparatus for detecting disturbances within an enclosure by detecting frequency changes between transmitted and received energy radiations, the combination of means for generating energy radiations having a modulated frequency within a given band of ultrasonic frequencies, means for generating energy radiations having a substantially constant frequency within said band of frequencies, means for transmitting both radiations, means for receiving said radiations, a detector for generating a pulse each instant the modulated frequency is equal to the constant frequency and being operatively connected to said constant frequency radiation generating means and said receiving means to detect changes between transmitted and received frequencies, and means for causing the pulses to vary the input from said receiving means to said detector in relation to the amplitude of the pulses.

10. In a network for controlling the sensitivity of apparatus for detecting disturbances within an enclosure by detecting frequency changes between transmitted and received energy radiations, the combination of means for generating energy radiations having a frequency modulated within a given band of frequencies, means for generating energy radiations having a substantially constant frequency within said band of frequencies, means for transmitting both radiations, means for receiving said radiations, a detector for generating a pulse each instant the modulated frequency is equal to the constant frequency and being operatively connected to said constant frequency radiation generating means and said receiving means and adapted to detect changes between transmitted and received frequencies, means for averaging the amplitude of a substantial number of received pulses, and means for causing the averaged pulses to vary the input from said receiving means to said detector in relation to the amplitude of the pulses.

11. In a network for controlling the sensitivity of apparatus for detecting disturbances within an enclosure by detecting frequency changes between transmitted and received energy radiations, the combination of means for generating energy radiations having a modulated frequency ranging from about 14 to about 24 kilo-cycles per second, means for generating energy radiations having a substantially constant frequency of about 19.2 kilo-cycles per second, means for transmitting both radiations, means for receiving said radiations, a detector operatively connected to said receiving means and said constant frequency generating means for detecting frequency changes between transmitted and received radiations and for generating a pulse at about one second intervals in response to said received radiations, a time constant network for averaging the amplitude of the pulses for a period of between about 3 and about 10 minutes, and means for causing the averaged pulses to vary the input amplitude from said receiving means to the detector in relation to the average amplitude of the pulses to thereby attain automatic sensitivity control.

12. In a network for controlling the sensitivity of apparatus for detecting disturbances within an enclosure by detecting frequency changes between transmitted and received energy radiations, the combination of a detecting system for generating an intermittent signal, means for generating pulses in response to said signal, and means operable by the pulses and utilizing the amplitude of the pulses to control the sensitivity detecting system.

13. A network for controlling the sensitivity of an electronic detector, which network comprises a normally balanced capacitance-type bridge including a first side having first and second capacitors connected in series and a second side having a third capacitor and a voltage sensitive capacitor connected in series, a high frequency input connected across the junctions of said sides, a low frequency fluctuating input having one side connected to the junction of said sides where said first capacitor and said voltage sensitive capacitor are located and having its other side connected between said third capacitor and said voltage sensitive capacitor, and an output having one side connected between said third capacitor and said rectifying element and having its other side connected between said first and second capacitors.

14. A network for controlling the sensitivity of an electronic detector, which network comprises a normally balanced capacitance-type bridge including a first side having a variable capacitor and a second capacitor connected in series and a second side having a third capacitor and a voltage sensitive capacitor connected in series, a high frequency input connected across the junctions of said sides, a low frequency fluctuating input having one side connected to the junction of said sides where said variable capacitor and voltage sensitive capacitor are located and having its other side connected between said third capacitor and said voltage sensitive capacitor, and an output having one side connected between said third capacitor and said voltage sensitive capacitor and having its other side connected between said variable capacitor and said second capacitor.

15. A network for controlling the sensitivity of an electronic detector, which network comprises a normally balanced capacitance-type bridge including a first side having first and second capacitors connected in series and a second side having a third capacitor and a PN silicon rectifying element connected in series, a high frequency input connected across the junctions of said sides, a low frequency fluctuating input having one side connected to the junction of said sides where said first capacitor and said rectifying element are located and having its other side connected between said third capacitor and said rectifying element, and an output having one side connected between said third capacitor and said rectifying element and having its other side connected between said first and second capacitors.

16. In apparatus for detecting disturbances within an enclosure by detecting frequency changes between transmitted and received radiations, the combination of means for generating electrical radiations and energy radiations both having the same substantially constant high frequency, means for generating energy radiations having a modulated frequency, means for transmitting both energy radiations, means for receiving both radiations and transducing the same to electrical radiations, a detector operatively connected to said receiving means and said electrical radiation generating means and arranged to generate a low frequency pulse each instant the frequencies of the received radiations are equal to each other and to detect a change in frequency between the generated high frequency radiations and the received high frequency radiations, means connected to the output of said detector for amplifying and rectifying the pulses and a signal produced by detected changes in frequency, a relay circuit connected to the output of said last mentioned means, a slow acting relay connected to the output of said relay circuit and being responsive to the signal from said detector but unaffected by pulses, a pulse integrator and rectifier connected to the output of said relay circuit, and sensitivity control means having an input connected to the output of said pulse integrator and rectifier and having an input and an output which operatively connects said receiving means to said detector and being arranged to cause the pulses to vary its output to said detector and thereby control the sensitivity of said detector to the detection of changes in frequency.

17. In a network for controlling the sensitivity of apparatus for detecting disturbances within an enclosure, the combination of means for generating a sampling signal periodically, means for receiving the signal, and means for adjusting the sensitivity of the apparatus in response to the average amplitude of the received sampling signals.

18. A network according to claim 17, including means for utilizing the periodic sampling signal to indicate the functioning of the apparatus.

19. In apparatus for detecting frequency changes between transmitted and received radiations caused by disturbances within an enclosure, a network for indicating the functioning of the apparatus comprising a detector for interacting energy radiations of different high frequency values selected to create a low frequency signal and responsive to frequency changes between transmitted and received radiations, means for receiving the signal and translating the same into pulses, and means for utilizing the pulses to indicate the functioning of the apparatus.

References Cited in the file of this patent

UNITED STATES PATENTS

| 2,646,559 | Nutzler | July 21, 1953 |
| 2,749,537 | Loudon | June 5, 1956 |
| 2,794,974 | Bagno | June 4, 1957 |

FOREIGN PATENTS

| 688,117 | Great Britain | Feb. 25, 1953 |